United States Patent
Schepis et al.

(10) Patent No.: US 9,292,404 B1
(45) Date of Patent: Mar. 22, 2016

(54) METHODS AND SYSTEMS FOR PROVIDING CONTEXT FOR PARENTAL-CONTROL-POLICY VIOLATIONS

(75) Inventors: Adam Schepis, Milford, MA (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 1222 days.

(21) Appl. No.: 12/363,803

(22) Filed: Feb. 2, 2009

(51) Int. Cl.
*G06F 11/30* (2006.01)
*G06F 11/07* (2006.01)
*G06F 21/55* (2013.01)

(52) U.S. Cl.
CPC ........ *G06F 11/3072* (2013.01); *G06F 11/0775* (2013.01); *G06F 11/3075* (2013.01); *G06F 21/552* (2013.01); *G06F 21/554* (2013.01)

(58) Field of Classification Search
USPC .................................................... 726/1, 6, 22
See application file for complete search history.

(56) References Cited

U.S. PATENT DOCUMENTS

| | | | |
|---|---|---|---|
| 5,987,611 A * | 11/1999 | Freund ............................... | 726/4 |
| 7,356,836 B2 * | 4/2008 | Beilinson et al. .................. | 726/4 |
| 7,797,735 B2 * | 9/2010 | Beilinson et al. .................. | 726/4 |
| 2003/0105822 A1 * | 6/2003 | Gusler et al. .................. | 709/206 |
| 2005/0228881 A1 * | 10/2005 | Reasor et al. .................. | 709/224 |
| 2006/0123478 A1 * | 6/2006 | Rehfuss et al. .................. | 726/22 |
| 2006/0161669 A1 * | 7/2006 | Mathew et al. ............... | 709/229 |
| 2007/0174915 A1 * | 7/2007 | Gribble et al. .................. | 726/24 |
| 2008/0195369 A1 * | 8/2008 | Duyanovich et al. ........... | 703/22 |
| 2008/0244704 A1 * | 10/2008 | Lotter et al. ..................... | 726/3 |
| 2008/0282338 A1 * | 11/2008 | Beer .............................. | 726/12 |

OTHER PUBLICATIONS

Wetmore, Bradford Rice—Paradigms for the Reduction of Audit Trails. Humboldt State University 1993. http://seclab.cs.ucdavis.edu/papers/wetmore.thesis.pdf.*

* cited by examiner

*Primary Examiner* — Jung Kim
*Assistant Examiner* — Ngoc D Nguyen
(74) *Attorney, Agent, or Firm* — ALG Intellectual Property, LLC (57) ABSTRACT

A computer-implemented method may include tracking a child's usage of a computing system. The computer-implemented method may also include generating an event history based on the child's usage of the computing system and identifying a restricted event that violated a parental-control policy. The computer-implemented method may further include creating an event trail by identifying at least one event in the event history that led to the restricted event. Various other methods, systems, and computer-readable media are also disclosed.

20 Claims, 7 Drawing Sheets

METHODS AND SYSTEMS FOR PROVIDING CONTEXT FOR PARENTAL-CONTROL-POLICY VIOLATIONS

BACKGROUND

Children increasingly use computers in their everyday activities and may access a variety of content through their computers. A parent or organization may wish to exercise control over the content to which a child is exposed. For example, a parent may want to prevent a child from accessing inappropriate websites or exchanging inappropriate content.

A parent may use parental-control software to prevent a child from accessing inappropriate content. Parental-control software may allow the parent to create parental control policies to block the child from accessing inappropriate content. Beyond merely preventing a child from accessing inappropriate content, some parental control software may relay to the parent a child's attempts to access inappropriate content.

Parents may try to use information from parental-control software to stay involved in the content-control process. For example, a parent may wish to discuss a child's interest in inappropriate content with a child, discipline a child, or simply stay informed about a child's activities. However, traditional parental-control software may not give parents enough information to enable the parents to understand what happened or to decide on a best course of action. For example, a parent may not know why a child attempted to access the inappropriate content or whether the attempt to access inappropriate content was a mistake or out of a child's control.

SUMMARY

The present disclosure is directed to methods, systems, and apparatus for providing context for parental-control-policy violations. Some embodiments may provide a parent with the context of a child's violation of a parental-control policy. For example, a monitoring module may track a child's usage of a computing system. An event-history module may generate an event history based on the child's usage of the computing system. The event-history module may also identify a restricted event that violated a parental-control policy. The event-history module may then create an event trail by identifying at least one event in the event history that led to the restricted event.

In some embodiments, a policy-violation module may access a parental-control policy in a policy database and may enforce the parental-control policy in response to the violation. The policy-violation module may also report the violation and the event trail to a user, such as a parent.

In some embodiments, the event-history module may identify actionable content within an event that led to the restricted event. The event-history module may determine that the actionable content initiated the restricted event. For example, the actionable content may include a hyperlink that links to a restricted website. In some embodiments, the event-history module may determine that actionable content in the event trail includes self-executing content. In other embodiments, the event-history module may analyze the event trail to determine that actionable content in the event trail includes misleading information, such as a hyperlink that appears to link to an unrestricted website but is configured to link to a restricted website. The instant disclosure also presents various other embodiments, alternatives, and examples for providing context for a parent-control-policy violation.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Embodiments of the present disclosure include various methods, systems, and apparatus for providing context for parental-control-policy violations. For example, in some embodiments, a monitoring module may track a child's usage of a computing system, and an event-history module may generate an event history based on the child's usage of the computing system. The event-history module may also identify a restricted event that violated a parental-control-policy and may create an event trail by identifying at least one event in the event history that led to the restricted event. A policy-violation module may provide a user with a context for the restricted event by providing the event trail to the user. Embodiments of the present disclosure may help parents better understand and address parental-control-policy violations. Some embodiments may also help parents make more intelligent parental-control-policy decisions. These and other embodiments, features, and advantages will be more fully understood upon reading the following detailed description in conjunction with the accompanying drawings and claims.

Figure 1:
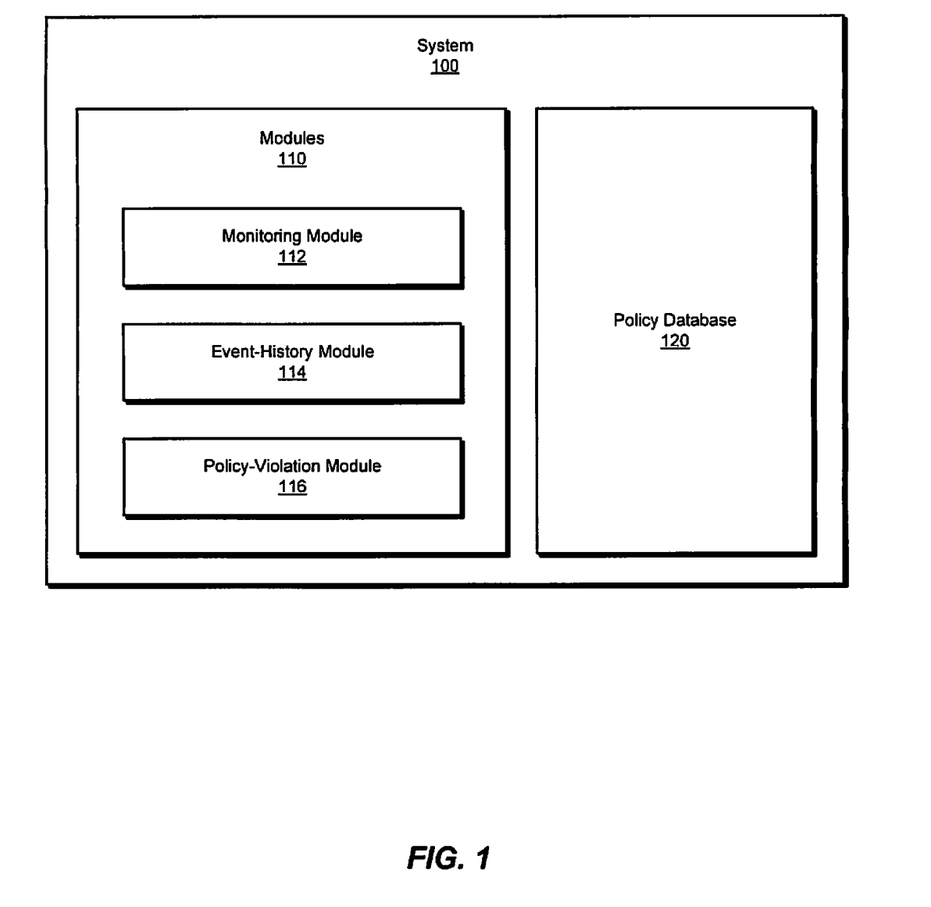
FIG. 1 is a block diagram of an exemplary computing system for providing a context for parental-control-policy violations according to certain embodiments.
Figure 2:
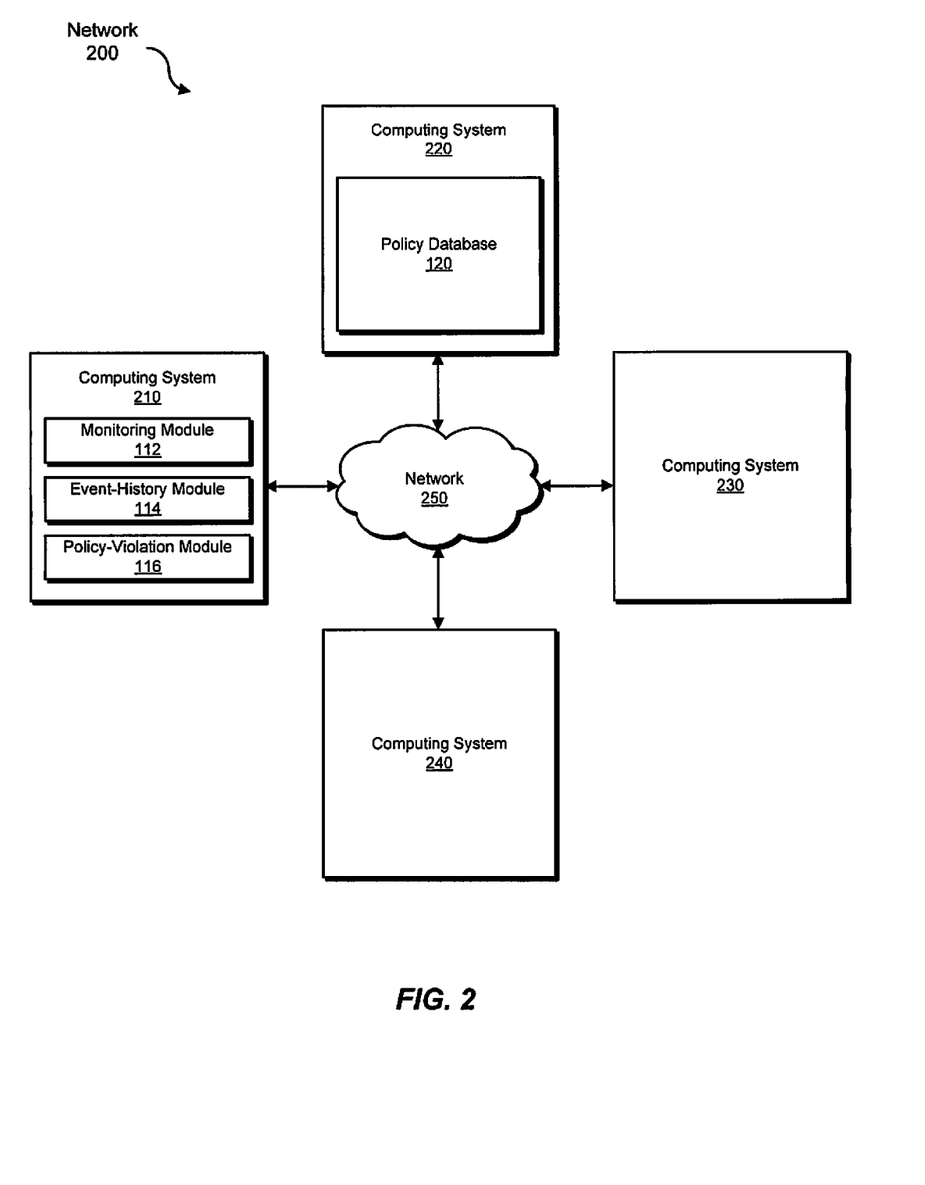
FIG. 2 is a block diagram of an exemplary network for providing a context for parental-control-policy violations according to certain embodiments.
Figure 3:
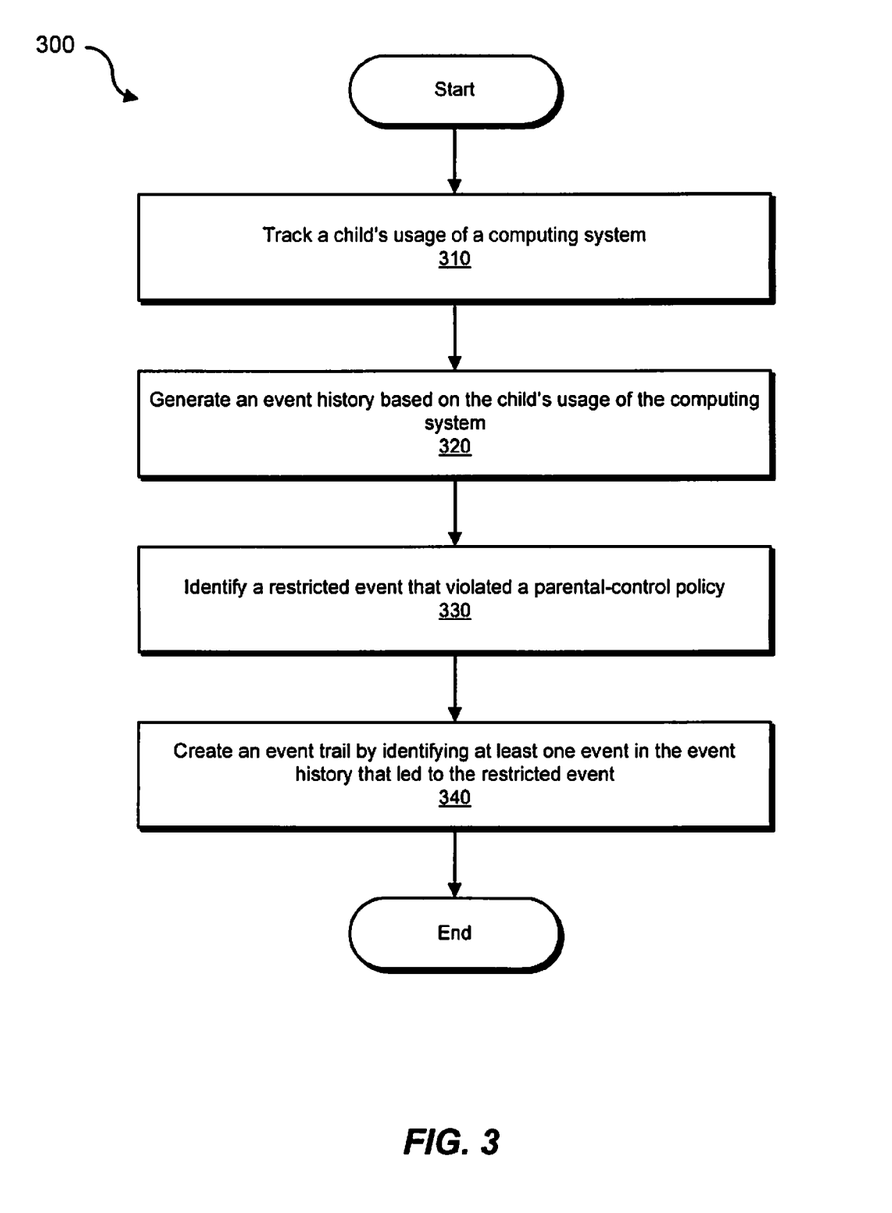
FIG. 3 is a flow diagram of an exemplary computer-implemented method for providing a context for parental-control-policy violations according to certain embodiments.
Figure 4:
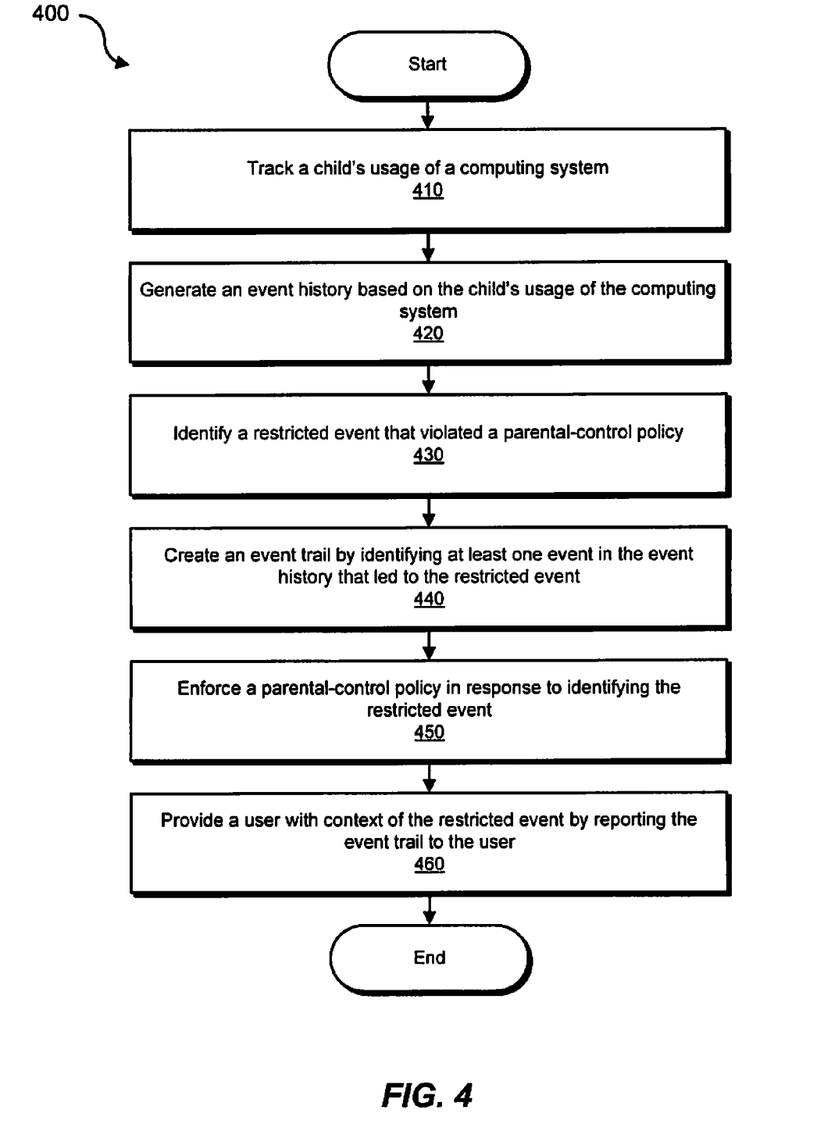
FIG. 4 is another flow diagram of an exemplary computer-implemented method for providing a context for parental-control-policy violations according to certain embodiments.
Figure 5:
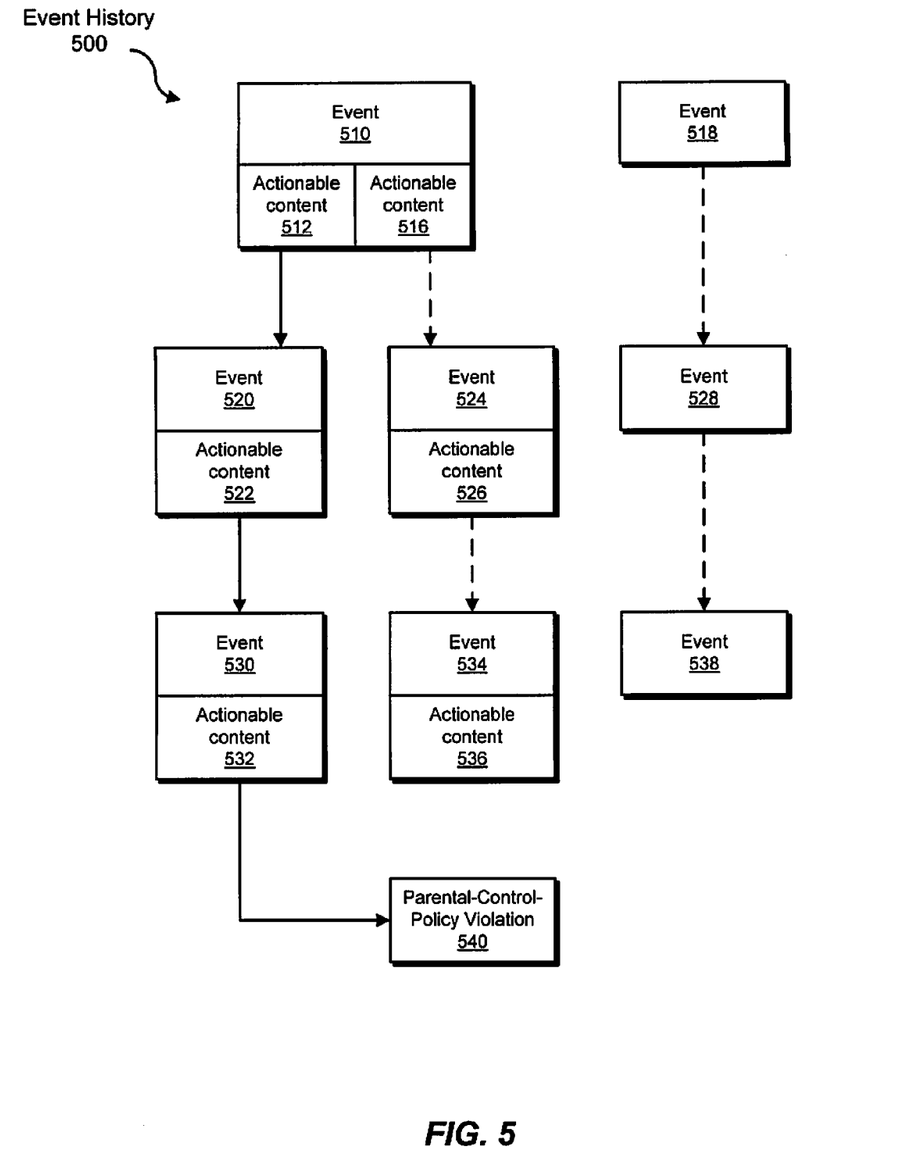
FIG. 5 is a block diagram of an exemplary event history according to certain embodiments.
Figure 6:
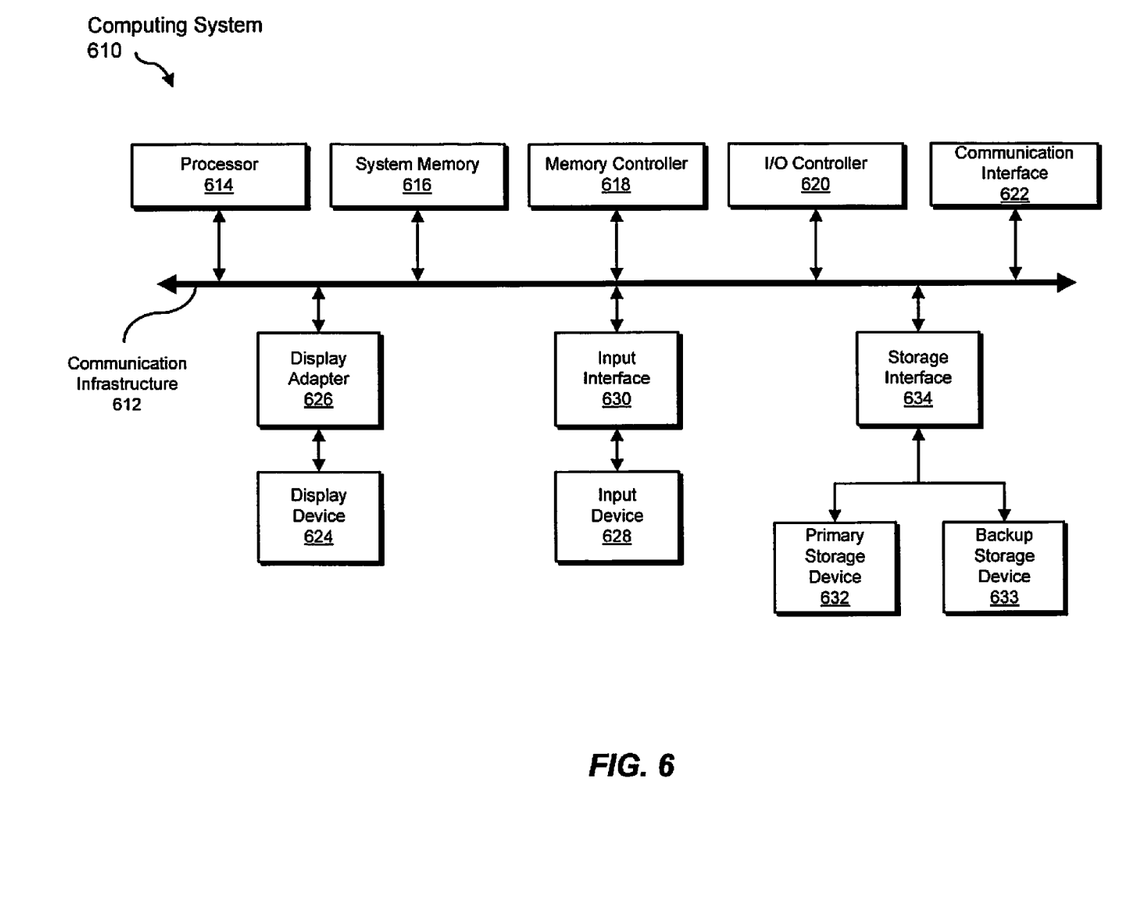
FIG. 6 is a block diagram of an exemplary computing system capable of implementing one or more of the embodiments described and/or illustrated herein.
Figure 7:
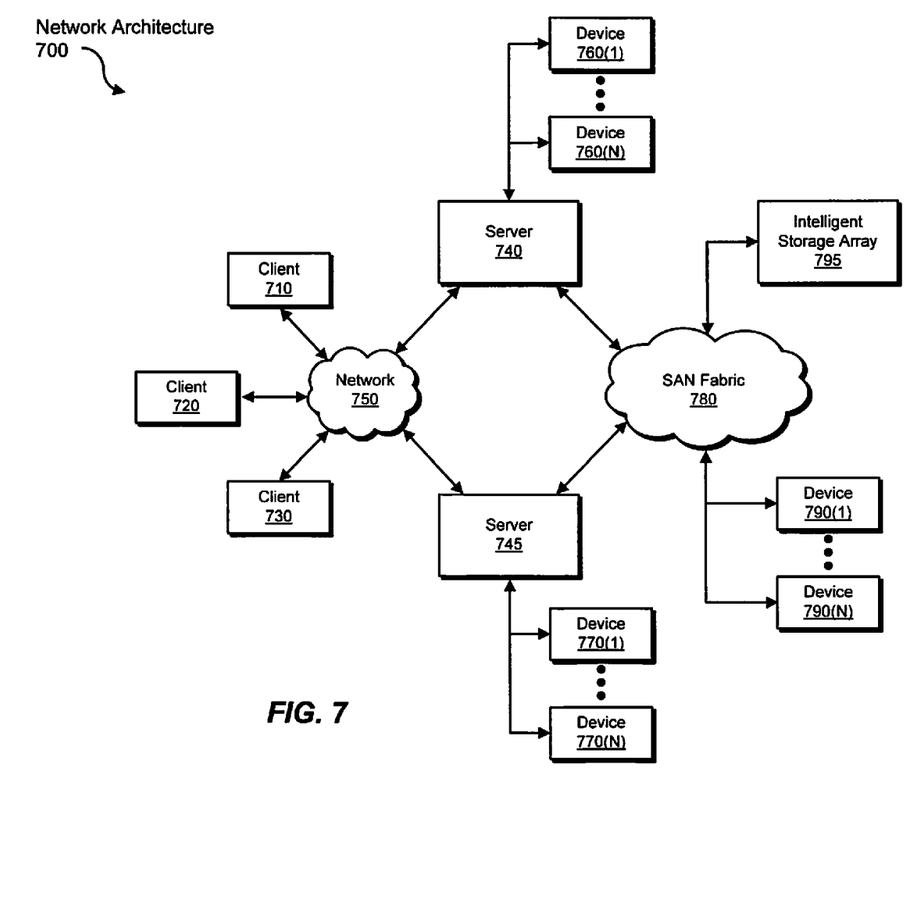
FIG. 7 is a block diagram of an exemplary computing system capable of implementing one or more of the embodiments described and/or illustrated herein.

FIG. 1 illustrates an exemplary system for providing a context for parental-control-policy violations, and FIG. 2 shows an exemplary network for implementing the system of FIG. 1. FIGS. 3 and 4 show methods for providing context for parental-control-policy violations, and FIG. 5 shows an exemplary event history. FIGS. 6 and 7 illustrate an exemplary computing system and network architecture for implementing various embodiments of the instant disclosure.

FIG. 1 shows an exemplary system 100 for providing context for parental-control-policy violations. System 100 may include modules 110 and a policy database 120. Modules 110 may include a monitoring module 112, an event-history module 114, and a policy-violation module 116. Monitoring module 112 may include any computer-executable code programmed to track a child's usage of a computing system. Event-history module 114 may include any computer-executable code programmed to generate an event history based on the child's usage of the computing system. Event-history module 114 may also be programmed to identify a restricted event in the event history and/or create an event trail by identifying at least one event in the event history that led to the restricted event. Policy-violation module 116 may be programmed to access a parental-control policy from policy database 120, enforce the parental-control policy in response to the violation, report the violation to a user, and/or report the event trail to the user.

In certain embodiments, one or more of modules 110 in FIG. 1 may represent one or more software applications or programs that, when executed by a computing system, may cause the computing to perform one or more steps disclosed herein. For example, as will be described in greater detail below, one or more of modules 110 may represent software modules configured to run on one or more computing devices, such as computing system 610 in FIG. 6 and/or portions of exemplary network architecture 700 in FIG. 7. One or more modules 110 in FIG. 1 may also represent all or portions of one or more special-purpose computers configured to perform one or more of the tasks associated with steps disclosed herein.

As previously mentioned, in addition to including module 110, system 100 may include policy database 120. Policy database 120 may include any data structure and/or storage device capable of storing one or more parental-control policies. Policy database 120 may represent a portion of one or more computing devices. For example, policy database 120 may represent a portion of computing system 610 in FIG. 6 and/or portions of exemplary network architecture 700 in FIG. 7.

Monitoring module 112, event-history module 114, policy-violation module 116, and/or policy database 120 may be located on two or more computing systems. For example, monitoring module 112, event-history module 114, and policy-violation module 116 may be included on an end-user's computing device while policy database 120 may be included on a remote server. In other embodiments, policy database 120 may also be included on an end-user's computing device.

FIG. 2 illustrates an exemplary network 200 that may include various components illustrated in FIG. 1. Network 200 may include a computing system 210, a computing system 220, a computing system 230, a computing system 240, and a network 250. Computing systems 210, 220, 230, and/or 240 may include one or more of the components of computing system 610 in FIG. 6 and/or one or more of the components of network architecture 700 in FIG. 7. As shown in FIG. 2, computing system 210 may include monitoring module 112, event-history module 114, and policy-violation module 116. Computing system 220 may include policy database 120. Computing system 210 may be a computing system used by a child, and computing system 220 may be a remote system that stores parental controls associated with the child in policy database 120.

Computing systems 210, 220, 230, and 240 may communicate over a network 250. Network 250 generally represents any medium or architecture capable of facilitating communication or data transfer. Network 250 may include, without limitation, an intranet, a Wide Area Network (WAN), a Local Area Network (LAN), a Personal Area Network (PAN), the Internet, Power Line Communications (PLC), a cellular network (e.g., a GSM network), or the like. Network 250 may facilitate communication or data transfer using wireless and/or wired communications.

As an example of how embodiments of the instant disclosure may be implemented in network 200, a child may use computing system 210 to access computing resources on computing system 210 and on other computing systems, such as computing system 230 and computing system 240. For example, the child may communicate with a friend who uses computing system 240. The child may send emails to and receive emails from the friend. In one example, the friend may use computing system 240 to send the child an email that includes a hyperlink to inappropriate content stored on computing system 230. The child may follow the hyperlink to the inappropriate content on computing system 230, thereby triggering a violation of a parental-control policy stored in policy database 120 on computing system 220.

Event-history module 114 may track communications between the child and the friend. Event-history module 114 may also generate an event history that includes information about the communications between the child and the friend. Event-history module 114 may identify a restricted event (i.e., the child following the hyperlink to the inappropriate content) that violated the parental-control policy. Event-history module 114 may create an event trail by identifying the email that resulted in the navigation to the restricted content. This event trail may provide a context to a parent about how and/or why the child violated the parental-control policy.

FIG. 3 shows an exemplary method for providing a context for parental-control-policy violations. The steps shown in FIG. 3 may be performed by any suitable computer-executable code and/or computing system. In some embodiments, the steps shown in FIG. 3 may be performed by one or more of monitoring module 112, event-history module 114, policy-violation module 116, and/or policy database 120. For example, at step 310 monitoring module 112 may track a child's usage of computing system 210. Monitoring module 112 may track a child's usage of computing system 210 by monitoring a child's attempt to use or access any computer resource and/or network resource. For example, monitoring module 112 may track one or more actions performed by the child on computing system 210. In some embodiments, monitoring module 112 may monitor instant messaging, email, and/or web surfing activities performed by the child.

Monitoring module 112 may track a child's usage of a computing system by monitoring input to computing system 210. For example, monitoring module 112 may monitor keyboard and/or mouse input from a child. In various embodiments, monitoring module 112 may monitor a child's input to one or more resources controlled by a parental-control-policy. For example, monitoring module 112 may monitor user's input to resources such as web browsers, instant messengers, email clients, and/or any other computing resource.

At step 320, event-history module 114 may generate an event history based on the child's usage of the computing system. The event history may be generated in any suitable manner. In some embodiments, the event history may be generated by storing information obtained while tracking the child's usage of the computing system. For example, the event history may include each action the child performed on computing system 210. In other embodiments, event-history module 114 may create the event history by storing events associated with actions controlled by one or more parental-control policies. For example, if web browsing and email use are events controlled by parental-control policies (i.e., events for which parental-control policies are enforced), event-history module 114 may generate an event history that includes events associated with email use and web browsing.

As used herein, the term "event" may refer to any action performed on and/or by a computing device. For example, an event may include receiving an email, displaying an email, sending an email, receiving an instant message, displaying an instant message, sending an instant message, navigating to a website, opening a program such as an email or instant messaging program, receiving input from a user, and/or any other action that may be performed on or by a computing device.

An event history may be any set of one or more events. For example, an event history may include a list of events that have occurred on computing system 210. In some embodiments, an event history may be kept for a predetermined amount of time, such as one hour, one day, one week, or any other suitable period of time. Event-history module 114 may also keep an event history indefinitely. An event history may be structured in any suitable data structure, such as a linked list or a tree.

As noted, the event history may be based on a child's usage of computing system 210. In other words, the event history may include one or more events that occurred on computing system 210 while a child was using computing system 210. In some embodiments, the event history may only include events based on a child's usage of computing system 210. In other embodiments, the event history may also include events associated with other users.

An event history and/or events in an event history may be associated with a child. For example, a child may log in to computing system 210 using his or her own user name and/or password. Monitoring module 112 and/or event-history module 114 may determine that the child is using the computing device based on the log information and may associate any events that occur while the child is logged in with the child.

At step 330, event-history module 114 may identify, in the event history, a restricted event that violated a parental-control policy. Event-history module 114 may identify a restricted event in any suitable manner. For example, event-history module 114 may identify a restricted event by accessing policy database 120 to determine whether one or more events in the event history violate a parental-control policy. In other embodiments, event-history module 114 may be in communication with and/or included in parental-control software. The parental-control software may communicate with event-history module 114 to inform event-history module 114 when an event has violated a parental-control policy. For example, the parental-control software may, upon detection of a policy violation, send a message to event-history module 114 identifying an event that caused the violation (i.e., a restricted event).

As used herein, the phrase "restricted event" generally refers to any event covered by a parental-control policy. For example, a restricted event may be an activity that is prohibited or otherwise restricted for a child. Restricted events may include browsing websites with inappropriate content, sending and/or receiving electronic messages with inappropriate content, using a resource (e.g., a Voice Over Internet Protocol (VOIP) phone or an electronic messaging system) at a prohibited time, and/or any other event that may be covered by a parental-control policy.

The phrase "parental-control policies," as used herein, generally refers to policies and/or settings that control access to computing information and/or resources (e.g., the Internet and/or a computing system). Parental-control policies may include policies that restrict, limit, prohibit, or otherwise control activities of children. For example, parental-control policies may include policies that limit access to various types of objectionable content and/or content that may be inappropriate for children of a particular age. In some embodiments, a parental-control policy may set forth approved or prohibited websites. In certain embodiments, a parental-control policy may define a time period in which a child may access data (e.g., a time limit on a child's Internet use). A parental-control policy may also control which applications a child may execute. In some embodiments, a parental-control policy may set forth file permissions for a child and/or may define access control for other computer resources.

At step 340, event-history module 114 may create an event trail by identifying at least one event in the event history that led to the restricted event. Event-history module 114 may create the event trail by identifying one or more events that are related to the restricted event. For example, event-history module 114 may identify an event that caused the restricted event.

An event trail may include any identification, list, or other collection of one or more events that led to a restricted event. For example, if the restricted event includes receiving an instant message with inappropriate content, the event trail may identify other messages in the same session that were exchanged before the restricted event. The other messages may be identified as events that led to the restricted event. In other embodiments, an event trail may be created by identifying events that led to a child browsing to a restricted website. For example, event-history module 114 may determine that a child received a link to the restricted website in an email, such as a spam email.

An event trail may include any information related to an event. For example, if the event includes a communication, the event trail may include information identifying a source of the communication. Information identifying a source of a communication may be any information that identifies where the communication (e.g., an email, an instant message, a VOIP telephone call) originates. Information identifying a source of a communication may include an email address, a telephone number, an IP address, or any other suitable identification information.

The event trail may additionally or alternatively indicate a target of a communication. A target of a communication may be any information that identifies a recipient or destination of a communication. In some embodiments, the event trail may include information identifying actionable content in a communication. The event trail may include information indicating whether a communication is from someone the child knows. The event trail may additionally or alternatively include a portion of or all content of a communication or other event. The event trail may also include a time and/or duration of an event.

According to various embodiments, policy-violation module 116 may identify actionable content within at least one event that led to the restricted event. As used herein, the phrase "actionable content" may generally refer to any content capable of initiating and/or generating another event. For example, actionable content may include a hyperlink. In this example, event-history module 114 may determine that the actionable content (i.e., the hyperlink) initiated the restricted event (i.e., navigating to a restricted website) by directing a browser used by the child to the restricted website.

In some embodiments, event-history module 114 may determine that actionable content in the event trail includes self-executing content. As used herein, the phrase "self-executing content" generally refers to any content that initiates or generates another event independent of action and/or input from a user. For example, self-executing content may include a pop-up window that automatically pops up when a user navigates to a website. If the pop-up window includes objectionable material and triggers a parental-control-policy violation, event-history module 114 may indicate in the event trail that the violation was caused by self-executing content (i.e., the pop-up window).

According to various embodiments, event-history module 114 may analyze the event trail to determine that actionable content in the event trail includes misleading information. In other words, event-history module 114 may identify content that may have tricked or otherwise misled a child into performing a restricted action on computing system 210. As used herein, the phrase "misleading information" may generally refer to any information that may mislead a child into thinking that the child is performing an unrestricted action when the child is actually performing a restricted action. For example, the actionable content may include a hyperlink that appears to link to an unrestricted (e.g., appropriate) website but actually links to a restricted (e.g., inappropriate) website.

In some embodiments, event-history module 114 may analyze an event trail to provide a summary of events in the event trail. A summary of events in the event trail may include any information from the event trail that may be presented to a user to help the user understand a context of the restricted event. A summary of events may include a plain-text description of one or more events that led to the restricted event. For example, if the restricted event includes visiting an inappropriate website and an event that led to the restricted event includes receiving an email with a hyperlink from a friend named John, the summary may state: "The child appeared to navigate to the restricted website from an email received from a John."

FIG. 4 shows another example of an exemplary computer-implemented method for providing context for parental-control-policy violations. The steps shown in FIG. 4 may be performed by any suitable computing system and/or computer-executable code. For example, at step 410 monitoring module 112 may track a child's usage of a computing system. At step 420, event-history module 114 may generate an event history based on the child's usage of the computing system. At step 430, event-history module 114 may identify a restricted event that violated a parental-control policy. At step 440, event-history module 114 may create an event trail by identifying at least one event in the event history that led to the restricted event.

At step 450, policy-violation module 116 may enforce a parental-control policy in response to identifying the restricted event. Policy-violation module 116 may enforce the parental-control policy in any suitable manner. For example, policy-violation module 116 may enforce a parental-control policy by preventing a child from viewing a website, by preventing a child from sending and/or receiving an electronic communication, and/or by preventing or restricting a child's use of any computer resource.

At step 460, policy-violation module 116 may provide a user with context of the restricted event by reporting the event trail to the user. In other embodiments, event-history module 114 or any other computer-executable code may report the event trail to the user. The event trail may be reported in any suitable manner. For example, the event trail may be reported as a list of one or more events that led to the restricted event. In other embodiments, the event trail may be reported to a user by presenting the user with a summary of one or more events that led to the restricted event.

FIG. 5 shows an exemplary event history 500. Event history 500 may include an event 510 with actionable content 512 and actionable content 514. Event history 500 may also include an event 520 with actionable content 522 and an event 524 with actionable content 526. Event history 500 may further include an event 530 with actionable content 532 and an event 534 with actionable content 536. Event history 500 may include an event 516, an event 528, and an event 538. Event history 500 may also include a parental-control-policy violation 540.

The events in FIG. 5 may occur in the following chronological order: 510, 518, 520, 524, 528, 530, 534, 538—followed by parental-control-policy violation 540. Events 518, 528, and 538 may represent an instant message conversation. For example, events 518 and 538 may each represent a child sending an instant message, and event 528 may represent the child receiving an instant message. Events 510, 520, 524, 530, and 534 may represent the child navigating to different websites. Actionable content 512, 516, 522, 526, 532, and 536 may represent hyperlinks in the websites. For example, event 510 may represent the child navigating to a website with two hyperlinks: actionable content 512 and actionable content 516.

As represented by FIG. 5, the child may have navigated to a website represented by event 510. The child may then have navigated to a website represented by event 520 through actionable content 512. The child may then have navigated to a website represented by event 524 through actionable content 516 (possibly in a separate browser window or tab). From the website of event 520, the child may then have navigated to the website of event 530. From the website of event 524, the child may then have navigated to the website of event 534. During this time, the child may have participated in the instant message conversation represented by events 518, 528, and 538. The child may have finally attempted to navigate from the website of event 530, through the hyperlink of actionable content 532, to a restricted website. Policy-violation module 116 may then have triggered parental-control-policy violation 540 and blocked the child's access.

Once policy-violation module 116 has triggered parental-control-policy violation 540, event-history module 116 may examine event history 500 to create an event trail. For instance, event-history module 116 may note that actionable content 532 led to parental-control-policy violation 540 and that event 530 included actionable content 532. Event-history module 116 may then note that event 520 led to event 530 by way of actionable content 522, and event 510 led to event 520 by way of actionable content 512.

Event-history module 116 may create an event trail for events leading to parental-control-policy violation 540. The event trail may include event 510, actionable content 512, event 520, actionable content 522, event 530, and actionable content 532. In some embodiments, event-history module 116 may also include additional events as context to the event trail. For example, along with the primary event trail, event-history module 116 may determine that since event 510 eventually led to parental-control-policy violation 540, all of its actionable content is suspect. In this example, event-history module 116 may include events 524 and 534 as wider context for the event trail so that a parent may review the content of the websites. Additionally or alternatively, event-history module 116 may observe that the instant message conversation of events 518, 528, and 538 occurred in the same time period as the events of the event trail. Event-history module 116 may include events 518, 528, and 538 so that the parent may review the instant message conversation to determine whether the conversation influenced the child's decisions on the path to parental-control-policy violation 540.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the tracking, generating, identifying, creating, determining, providing, enforcing, reporting, and/or analyzing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as tracking, generating, identifying, creating, determining, providing, enforcing, reporting, and/or analyzing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for tracking, generating, identifying, creating, determining, providing, enforcing, reporting, and/or analyzing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 602.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the tracking, generating, identifying, creating, determining, providing, enforcing, reporting, and/or analyzing steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the tracking, generating, identifying, creating, determining, providing, enforcing, reporting, and/or analyzing steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the tracking, generating, identifying, creating, determining, providing, enforcing, reporting, and/or analyzing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the tracking, generating, identifying, creating, determining, providing, enforcing, reporting, and/or analyzing steps disclosed herein. Network architecture 700 may also be used to perform and/or be a means for performing other steps and features set forth in the instant disclosure.

As detailed above, computing system 610 and/or one or more of components of network architecture 700 may perform and/or be a means a performing, either alone or in combination with other elements, one or more steps of the exemplary methods described and/or illustrated herein. For example, a computing system (e.g., computing system 610 and/or one or more of the components of network architecture 700) may perform a computer-implemented method for providing a context for parental-control-policy violations. The computing system may track a child's usage of the computing system. The computing system may also generate an event history based on the child's usage of the computing system and identify a restricted event that violated a parental-control policy. The computing system may create an event trail by identifying at least one event in the event history that led to the restricted event. In some embodiments, the computing system may identify actionable content within the at least one event that led to the restricted event. The computing system may also determine that the actionable content initiated the restricted event. In some embodiments, the at least one event that led to the restricted event may include at least one of receiving an instant message, receiving an email, and/or navigating to a website.

In some embodiments, the computing system may provide a user with a context of the restricted event by reporting the event trail to the user. In various embodiments, the computing system may enforce a parental-control policy in response to identifying the restricted event. In certain embodiments, the computing system may determine that actionable content in the event trail includes self-executing content and may report the determination that actionable content in the event trail comprises self-executing content to a user.

In various embodiments, determining that the actionable content in the event trail includes self-executing content may include determining that the actionable content includes a pop-up window. According to at least one embodiment, a computing system may analyze the event trail to determine that the actionable content in the event trail includes misleading information. In various embodiments, the actionable content may include a hyperlink that appears to link to an unrestricted website but is configured to link to a restricted website.

In various embodiments, the event trail may include at least one of: information identifying a source of a communication, information identifying a target of the communication, information identifying actionable content of the communication, content of the communication, and/or a time of the communication. In some embodiments, the computing system may analyze the event trail to provide a summary of events in the event trail.

In some embodiments, a system may include a policy database comprising a parental-control policy. The system may also include a monitoring module programmed to track a child's usage of a computing system. The system may further include an event-history module programmed to generate an event history based on the child's usage of the computing system, identify a restricted event that violated the parental-control policy, and create an event trail by identifying at least one event in the event history that led to the restricted event. The system may further include a policy-violation module programmed to access the parental-control policy from the policy database, enforce the parental-control policy in response to the violation, report the violation to a user, and report the event trail to the user.

In some embodiments, the event-history module may be programmed to create the event trail by identifying actionable content within the at least one event that led to the violation. The event-history module may also be programmed to determine that the actionable content generated a second event that led to the violation. In various embodiments, the at least one event that led to the restricted event may include at least one of receiving an instant message, receiving an email, and/or visiting a website. In some embodiments, the at least one event that led to the restricted event may include receiving the email and the email may include spam email.

According to at least one embodiment, the restricted event may include navigating to a restricted website. In various embodiments, analyzing the event trail to determine that the at least one event in the event history that led to restricted event may include receiving an electronic message from a person that the child knows. In some embodiments, the event-history module may be programmed to analyze the event trail to determine that the at least one event in the event history that led to the restricted event includes receiving an electronic message from a person that the child knows. In various embodiments, the event-history module may be programmed to analyze the event trail to determine that actionable content in the event trail includes misleading information.

According to at least one embodiment, a computer-readable medium may include one or more computer-executable instructions that, when executed by a computing device, cause the computing device to: track a child's usage of a computing system, generate an event history based on the child's usage of the computing system, identify a restricted event that led to a violation of a parental-control policy, and create an event trail by identifying at least one event in the event history that led to the violation. In some embodiments, the one or more computer-executable instructions may cause the computing device to enforce a parental-control policy in response to identifying the restricted event and provide the user with context of the restricted event by reporting the event trail to the user.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing context for parental-control-policy violations, the method being performed by a computing device comprising at least one processor, the method comprising:
   tracking a child's usage of a computing system;
   generating an event history that includes a first chain of at least two hyperlink selections and a second chain of at least two hyperlink selections based on the child's usage of the computing system;
   identifying a restricted event that violated a parental-control policy;
   creating an event trail that identifies, within the event history, a chain of hyperlink selections that led to the restricted event;
   determining that the first chain of hyperlink selections led to the violation of the parental-control policy;
   determining that the second chain of hyperlink selections did not lead to the violation of the parental-control policy;
   including the first chain of hyperlink selections in the event trail based on the determining that the first chain led to the violation of the parental-control policy;
   omitting the second chain of hyperlink selections from the event trail based on the determining that the second chain did not lead to the violation of the parental-control policy.

2. The computer-implemented method of claim 1, wherein the first chain of hyperlink selections comprises at least three hyperlink selections.

3. The computer-implemented method of claim 1, the method further comprising extracting the first chain of hyperlink selections from the event history and placing the first chain in the event trail.

4. The computer-implemented method of claim 1, wherein:
   a first event is included within the event trail;
   the first event comprises reception, by the child, of an electronic message, the electronic message comprising a hyperlink;
   the restricted event comprises selection, by the child, of the hyperlink, the hyperlink pointing to a restricted website, the method further comprising:
   providing a user with context for the violation of the parental-control policy at least in part by:
      informing the user that the child attempted to navigate to the restricted website by selecting the hyperlink in the electronic message received by the child;
      indicating, to the user, a source of the electronic message.

5. The computer-implemented method of claim 1, further comprising:
   determining that actionable content in the event trail comprises self-executing content that led to the restricted event;
   reporting the determination that actionable content in the event trail comprises self-executing content that led to the restricted event.

6. The computer-implemented method of claim 5, wherein determining that the actionable content in the event trail comprises the self-executing content comprises determining that the actionable content comprises a pop-up window.

7. The computer-implemented method of claim 1, further comprising analyzing the event trail to determine that actionable content in the event trail comprises misleading information.

8. The computer-implemented method of claim 7, wherein the actionable content comprises a hyperlink that appears to link to an unrestricted website but is configured to link to a restricted website.

9. The computer-implemented method of claim 1, wherein:
   the event trail comprises information identifying a source of a communication that led to the restricted event.

10. The computer-implemented method of claim 1, further comprising including in the event trail a plurality of electronic communications that led to the restricted event.

11. The computer-implemented method of claim 1, wherein creating the event trail that identifies the chain hyperlink selections comprises creating an event trail that specifies content that misled the child into performing the restricted event.

12. The computer-implemented method of claim 1, wherein at least one event identified in the event trail was not initiated by the child using the computing system.

13. The computer-implemented method of claim 1, wherein the second chain of hyperlink selections comprises at least three hyperlink selections.

14. The computer-implemented method of claim 1, wherein:
   the restricted event comprises receiving an instant message with inappropriate content;
   creating the event trail comprises identifying a plurality of instant messages exchanged between the child and a friend of the child during a same instant messaging session that the instant message with the inappropriate content was received.

15. The computer-implemented method of claim 1, wherein:
   at least one hyperlink selection in the second chain occurred in time between two hyperlink selections in the first chain.

16. A system comprising:
   a policy database comprising a parental-control policy;
   a monitoring module programmed to track a child's usage of a computing system;
   an event-history module programmed to:
      generate an event history that includes a first chain of at least two hyperlink selections and a second chain of at least two hyperlink selections based on the child's usage of the computing system;
      identify a restricted event that violated the parental-control policy;
      create an event trail that identifies, within the event history, a chain of hyperlink selections that led to the restricted event;
      determine that the first chain of hyperlink selections led to the violation of the parental-control policy;
      determine that the second chain of hyperlink selections did not lead to the violation of the parental-control policy;
      include the first chain of hyperlink selections in the event trail based on the determining that the first chain led to the violation of the parental-control policy;
      omit the second chain of hyperlink selections from the event trail based on the determining that the second chain did not lead to the violation of the parental-control policy;
   a policy-violation module programmed to:
      access the parental-control policy from the policy database;
      enforce the parental-control policy in response to the restricted event;
   at least one processor configured to execute the monitoring module, the event-history module, and the policy-violation module.

17. The system of claim 16, wherein the policy-violation module is programmed to provide a user with context for the violation of the parental-control policy upon detection of the violation.

18. The system of claim 16, wherein the event-history module is further programmed to analyze the event trail by determining that at least one event in the event history that led to the restricted event comprises receiving an electronic message from a person that the child knows.

19. A non-transitory computer-readable storage medium comprising one or more computer-executable instructions that, when executed by a computing device, cause the computing device to:
   track a child's usage of a computing system;
   generate an event history that includes a first chain of at least two hyperlink selections and a second chain of at least two hyperlink selections based on the child's usage of the computing system;
   identify a restricted event that led to a violation of a parental-control policy;
   create an event trail that identifies, within the event history a chain of hyperlink selections that led to the restricted event;
   determine that the first chain of hyperlink selections led to the violation of the parental-control policy;
   determine that the second chain of hyperlink selections did not lead to the violation of the parental-control policy;
   include the first chain of hyperlink selections in the event trail based on the determining that the first chain led to the violation of the parental-control policy;
   omit the second chain of hyperlink selections from the event trail based on the determining that the second chain did not lead to the violation of the parental-control policy.

20. The non-transitory computer-readable storage medium of claim 19, wherein the first chain of hyperlink selections comprises at least three hyperlink selections.

* * * * *